United States Patent [19]

Reynolds

[11] Patent Number: 4,560,852

[45] Date of Patent: Dec. 24, 1985

[54] SPIKE WELDING SYSTEM HAVING IMPROVED POWER SUPPLY

[75] Inventor: Roger G. Reynolds, Pontiac, Mich.

[73] Assignee: Weldex, Inc., Warren, Mich.

[21] Appl. No.: 672,746

[22] Filed: Nov. 19, 1984

[51] Int. Cl.⁴ .............................................. B23K 11/24
[52] U.S. Cl. ..................................... 219/113; 219/111; 219/114
[58] Field of Search ................. 219/108, 111, 113, 114

[56] References Cited

U.S. PATENT DOCUMENTS

| | | | |
|---|---|---|---|
| 2,306,230 | 12/1942 | Somerville | 219/113 |
| 2,459,153 | 1/1949 | England | 219/113 |
| 3,074,009 | 1/1963 | Dunnabeck et al. | 219/113 |
| 3,143,698 | 8/1964 | Rockafellow | 219/114 |
| 3,436,514 | 4/1969 | Broomhall et al. | 219/113 |

Primary Examiner—Clifford C. Shaw
Attorney, Agent, or Firm—Cullen, Sloman, Cantor, Grauer, Scott & Rutherford

[57] ABSTRACT

A power supply for a pulse type electrical resistance welder includes an A.C. source of electrical power, a firing circuit for delivering spikes of current to a pair of welding electrodes and a precharging circuit for precharging the firing circuit with a quantity of electrical energy sufficient to produce satisfactory welds in the first cycle or first few cycles of power. The precharging circuit is controlled by control circuit which includes a thumb wheel switch for presetting the voltage to which the firing circuit is to be precharged. A relay circuit automatically disconnects the precharging circuit from the firing circuit before the latter discharges its energy to the welding electrodes. A safety circuit is provided for automatically discharging the firing circuit in the event of a power failure.

14 Claims, 4 Drawing Figures

SPIKE WELDING SYSTEM HAVING IMPROVED POWER SUPPLY

TECHNICAL FIELD

The present invention broadly relates to electrical resistance welding, and deals more particularly with spike or a pulse type power supply for delivering electrical current pulses through the electrodes of a welder.

BACKGROUND ART

Resistance welding involves positioning a workpiece between a pair of electrodes through which electrical current is delivered from a power supply and then clamping the electrodes to squeeze the workpiece therebetween. Electrical current is delivered from one electrode through the workpiece to the other electrode at the point of contact between the electrodes and the workpiece. Heat generated by the resistance encountered by the current passing through a part of the workpiece melts the contact faces of the workpiece parts, thereby melting the parts to create a weld. In some cases, after the melted joint between the parts has reached a sufficiently high temperature, electrical current flow is terminated and pressure is maintained for a prescribed time interval to unite the part. In other cases, such as spot welding, the parts need not remain clamped after current flow is terminated.

One typical type of resistance welding apparatus is shown in U.S. Pat. No. 3,074,009 in which the electrodes receive electrical current from the secondary windings of a stepdown output transformer. The primary winding of the transformer is coupled in series with a capacitor, a source of A.C. electrical power and a pair of ignitrons or similar rectifier tubes. The ignitrons are phase shifted such that they begin to conduct just before the voltage peak in each half cycle of the power. Each time an ignitron begins to conduct, it places a charge on the capacitor approximately equal to this peak. The charge remains on the capacitor until the next half cycle when the other ignitron fires. The capacitor rapidly discharges its stored electrical potential into the primary of the output transformer, thereby generating a sharp pulse or spike in the secondary current of the transformer which is delivered to the welding electrodes. Thus, current is delivered to the electrodes through the transformer secondary in a series of spikes or pulses each equal to approximately twice the value of the instantaneous line voltage. This pulsed current power supply provides instantaneous localized heating of the welding surface which cannot be achieved by a lower current of proportionately longer duration because of the dissipation of the interface surface temperature by conduction. Thus, a lower value of power is required in these pulsed current systems and the undesirable secondary heating effects are minimized.

Although welding systems of the type shown in U.S. Pat. No. 3,074,009 described above are entirely suitable for many applications, they are less than completely desirable in others, and may not be used at all in some applications involving metal workpieces which must not be overheated, e.g., aluminum, dissimilar materials, coated materials, etc. It is therefore necessary to minimize the duration for which current pulses are applied to these types of materials, and in some cases the welding cycle must not exceed one or two pulses to avoid overheating the materials.

Producing satisfactory welds with only a very few number of current pulses has not been possible in the past because of limitations inherent in the power supply systems used in the prior art welders. The primary limitation resides in the manner in which the main storage capacitor is charged from the power supply circuit. When a weld is initially commenced, the capacitor is charged by an A.C. power supply, but does not reach full, steady state voltage for one or more cycles of the current. This factor is not a problem in most applications where a plurality of pulses is required to effect the weld, however, in those cases where only one or a few pulses are required, the capacitor may not have achieved a full charge during the first few cycles of current and the resulting current pulse or pulses may be inadequate in magnitude to produce a satisfactory weld.

Accordingly, it is a primary object of the present invention to overcome each of the deficiencies of the prior art systems described above.

It is also an object of the present invention to provide a power supply for pulse welders having the capability to generate voltage pulses during the first cycle or first few cycles which is greater in magnitude than the normal line voltage used to generate the pulses during steady state conditions.

Another object of the invention is to provide a power supply of the type mentioned above which includes a precharging circuit for precharging the firing capacitor to a preselected voltage and means for automatically disconnecting the precharging circuit from the capacitor when the latter is fired.

A still further object of the invention is to provide a power supply as described above which includes means for automatically discharging the firing capacitor in the event of a power failure.

These, and further objects of the invention will be made clear or will become apparent during the course of the following description of a preferred embodiment of the present invention.

SUMMARY OF THE INVENTION

According to the present invention, a power supply is provided for use with an electrical pulse type welding system, including a source of electrical power, a firing circuit and means for precharging the firing circuit with a quantity of electrical energy sufficient to produce satisfactory welds in the first cycle or first few cycles of power. The firing circuit includes a transformer having a primary, and a secondary adapted to be coupled with the welding electrodes for delivering current pulses to the electrodes. An A.C. firing capacitor forming a portion of the firing circuit stores a quantity of electrical energy sufficient in magnitude to produce each current pulse and means are provided for switching the power source into circuit with both the capacitor and the primary of the transformer in order to transfer the stored quantity of electrical energy in the capacitor to the transformers secondary. The precharging means includes a source of electrical power, means for coupling the electrical power with the capacitor, and selectively closable, normally open circuit connecting the power coupling means with the capacitor in order to prevent pre-charging of the capacitor during normal firing of the capacitor. The electrical power source for the precharging means preferably includes a power supply and means for at least half wave rectifying the power and means for selecting the voltage to which the capacitor is to be charged. The voltage selector may include a manually operable switch and means responsive to the switch for generating a count corresponding to the number of cycles of power required to pre-charge the capacitor to the desired voltage. The count generator may include a latch for storing a count generated by the switch means and a counter controlled by the count stored in the latch.

BRIEF DESCRIPTION OF THE DRAWINGS

In the drawings, which form a integral part of the specification and are to be read in conjunction therewith, and in which like reference numerals are employed to designate identical components in the various views.

DETAILED DESCRIPTION OF A PREFERRED EMBODIMENT OF THE INVENTION

Figure 1:
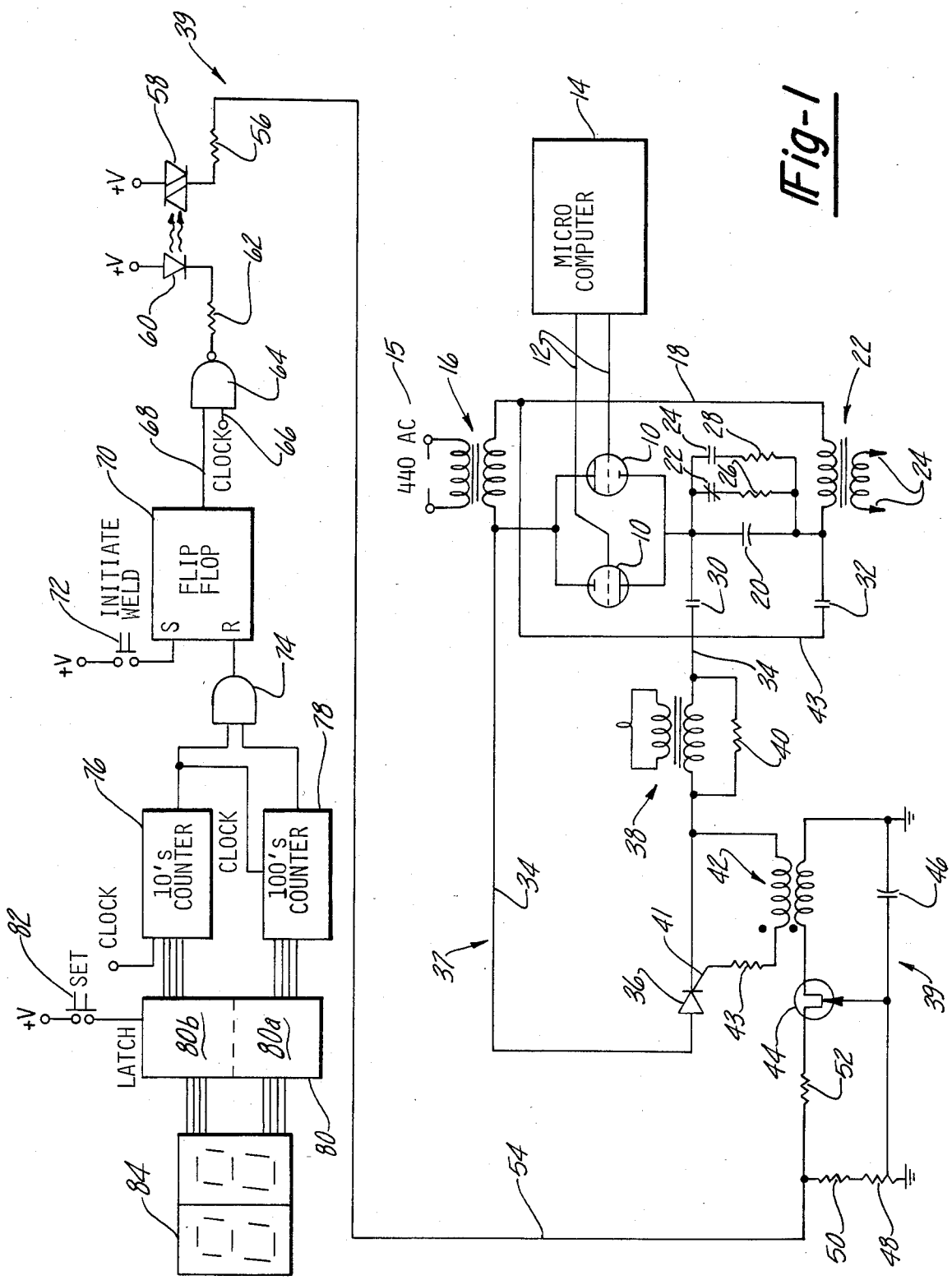
FIG. 1 is a combined block and schematic diagram for the power supply which forms the preferred embodiment of the present invention.

Attention is first directed to FIG. 1 which depicts the main circuit for the power supply of the present invention. The circuit functions to supply controlled "spikes" of voltage to a pair of welding electrodes 24 from a suitable source of power such as the 440 volt A.C. power supply 15. The welding electrodes 24 are designed to clamp the workpiece to be welded therebetween so that current flowing between the electrodes passes through the workpiece, resulting in high temperature fusion of the workpiece at the weld. The electrodes 24, as well as the mechanisms for clamping the electrodes 24 on the workpiece, are well known in the art and therefore need not be described in detail herein.

The 440 volt A.C. supply 15 is converted to 220 volts A.C. through a conventional step-down voltage transformer 16. The secondary of transformer 16 is connected in a series circuit (partially defined by line 18) with a pair of ignitron rectifier tubes 10, a firing capacitor 20 and the primary winding of a step-down output transformer 22, the secondary of transformer 22 being connected in series between the welding electrodes 24.

The ignitrons 10 are connected in parallel with each other, with the cathode of one tube 10 connected with the plate of the other tube 10 so that the tubes 10 are coupled in back-to-back relationship with each other and function as a full wave rectifier of the voltage derived from the secondary of transformer 16. The ignitrons 10 are alternately fired in timed relationship with each other by a suitable control circuit which typically will include a microcomputer 14 which delivers firing signals on lines 12 to the ignitrons 10. One suitable form of a control circuit and microcomputer 14 is described in detail in U.S. Pat. No. 4,458,123, the entire disclosure of which is incorporated herein by reference.

The ignitron tubes 10 are phase shifted so that they are controlled by the microcomputer 14 to conduct immediately before the voltage peak in each half cycle of the A.C. power. Each time one of the ignitron tubes 10 begins to conduct, it places a charge on the A.C. capacitor 20 approximately equal to this voltage peak. The charge remains on the capacitor 20 until the next half cycle when the other ignitron tube 10 fires. The A.C. capacitor 20 rapidly discharges the stored energy through the primary of the transformer 22, which results in a generation of a sharp current pulse in the secondary of the transformer 22. The number of cycles of A.C. voltage, and thus current pulses delivered to the electrodes 24, is controlled in a preprogrammed manner by the microcomputer 14.

In some cases it may be desirable or mandatory to delivery only a very few current pulses, and in some cases perhaps even a single current pulse to electrodes 24 in order to avoid overheating of the workpiece to be welded. This requires that the A.C. capacitor 20 be charged to at least its normal full value prior to the application of the first current pulse in order to assure that the first pulse or the first few pulses are at their normal value since current pulses lower than the normal value may be inadequate to produce a satisfactory weld.

The present invention involves, in part, recognition of the fact that current pulses of adequate magnitude during the first few cycles of applied voltage can be achieved by precharging the A.C. capacitor 20 prior to initiating the first weld. Toward this end, means are provided for precharging the A.C. capacitor 20 which broadly comprises a precharging circuit 37 and control circuit 39 for controlling the operation of the precharging circuit 37. The precharging circuit 37 is connected directly by line 34 between the secondary of transformer 16 and the A.C. capacitor 20. The precharging circuit 37 includes a rectifier in the nature of an SCR 36, and a transformer 38 connected between the SCR 36 and the capacitor 20. The SCR 36 includes a gate 41 which is operated by the control circuit 39 and functions to half wave rectify the A.C. voltage supplied by the transformer 16 alternatively, it should be noted here that a bridge circuit or the like could be employed to provide full wave rectification of the A.C. power, if desired. The transformer 38 includes a shorted secondary and a primary which is connected in series between the SCR 36 and the capacitor 20. A resistor 40 is connected in parallel with the primary of the transformer 38 to absorb current surges. The transformer 38 functions to store and transfer energy to the A.C. capacitor 20 during the precharging process.

As will be discussed later in more detail, the precharging circuit 37 precharges the A.C. capacitor 20 in preparation for a weld when the system is initialized, however, it is important that the precharging circuit 37 be disconnected from the A.C. capacitor 20 after the later has been fully precharged and is ready to be discharged. Toward this end, means are provided for automatically disconnecting the precharging circuit 37, which comprises a relay coil 90 (FIG. 2) operating a pair of normally open relay contacts 30, 32 (FIG. 1). Contact 30 is connected between the primary of the transformer 38 and one side of the A.C. capacitor 20, while the other contact 32 is connected between the other side of A.C. capacitor 20 and the primary of the transformer 16. It may thus be appreciated that when the contacts 30, 32 are open, both supply lines 34, 43 of the precharging circuit are disconnected from the capacitor 20, but normal charging of the A.C. capacitor 20 by the ignitron tubes 10 is in no way affected.

Figure 2:
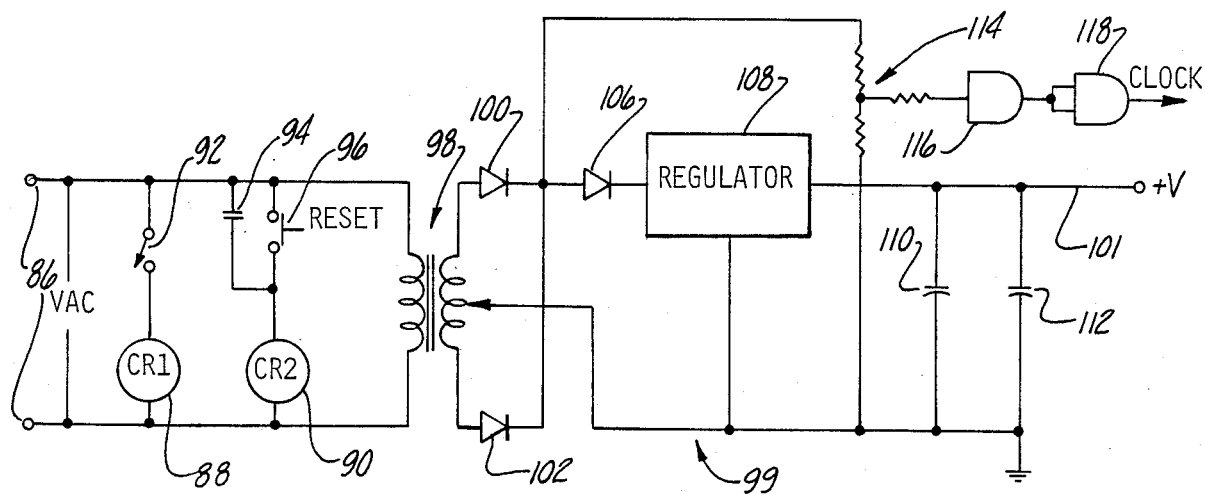
FIG. 2 is a detailed schematic diagram of a power converter and clock forming a portion of the power supply shown in FIG. 1.

As shown in FIG. 2, the relay coil 90 is energized by momentarily accuating a reset switch 96 which couples a source of A.C. voltage 86 across the coil 90. Energization of the coil 90 closes the normally open contacts 30, 32 for a duration sufficiently long to charge the capacitor 20 to the desired voltage.

An RC circuit comprising capacitor 24 and resistor 28 is connected in parallel with the capacitor 20 and functions to prevent damage to the capacitor 20 as result of peak current surges.

Also coupled in parallel relationship with the capacitor 20 are normally closed relay contacts 22 connected in series with a resistor 26. Contacts 22 are controlled by a relay coil 88 (FIG. 2) which is selectively connected across the A.C. voltage source 86 by a single pole, double throw switch 92. With coil 88 deenergized, the contacts 22 are normally closed, thereby short circuiting and discharging the capacitor 20. The switch 92 is normally closed so that the coil 88 is energized at all times when the system is operating normally. Under these conditions, in the event of a power failure, the coil 88 is deenergized, and the contacts 22 are switched from an open position to a closed position thereby discharging the capacitor 20. Discharging the capacitor 20 eliminates the risk of injury to personnel repairing or operating the system.

As previously mentioned, relay coils 88 and 90 are connected across a suitable source of power, such as the 110 volt A.C. power source 86. D.C. power for the electronic components of the system is provided by a power converter generally indicated at 99 which includes a step-down transformer 98 and a regulator 108. The primary of the transformer 98 is connected across the A.C. voltage source 86 and the secondary thereof in connected with diodes 100, 103 and 106 for rectifying the A.C. signal. The transformer 98 includes a center tap 104 which is connected to ground. A pair of filtering capacitors 110, 112 are connected across the D.C. voltage output 101. Clock signals are produced from the output of the secondary of transformer 98 using a voltage divider defined by a resistor network 114, and a pair of AND gates 116, 118 which square up the incoming signal into clock pulses.

Referring particularly now to FIG. 1, the details of the control circuit 39 will now be described in more detail. The voltage to which the capacitor 20 is precharged is dependent upon the number of A.C. cycles which are applied thereto. The number of cycles (and thus the precharge voltage) is preset by the operator using a conventional thumb wheel switch 84. The digital output of thumb wheel switch 84 is delivered to a latch 80 which includes a pair of four bit storage sections 80a, 80b. A switch 82 coupled with the D.C. voltage source 101 provides a means for setting the latch 80 in preparation for a precharging sequence. The output of the latch 80, and more particularly storage sections 80a, 80b are respectively delivered to a pair of corresponding counters 76, 78 which are driven by the clock signals output from AND gate 118 (FIG. 2). The count output from counters 76, 78 form the inputs of an AND gate 74, the output of which forms the reset input of a flip flop 70. The set input of flip flop 70 is connected to the D.C. voltage source 101 by a switch 72. Upon closure of switch 72 by the operator, the flip flop 70 is set, thereby outputing a pulse on line 68 to one input and NAND gate 64, a second input 66 thereof receiving clock signals from AND gate 118 (FIG. 2). After closure of switch of 72, the output of flip flop 70 on line 68 remains high until the flip flop 70 is reset by the output of counters 76, 78, which in turn depends upon their count. It may thus be appreciated that a high signal remains on line 68 for a time period corresponding to the number of cycles set by thumb wheel switch 84. The signal output from NAND gate 64 is delivered through a resistor 62 to an isolation switch which comprises a light emitting diode 60 and an optical SCR 58; this isolation switch functions to provide isolation in the circuit from noise and other transients.

The pulses output from the SCR 58 are delivered through a resistor 56 and line 54 to voltage divider network comprising resistors 48, 50 and 52. Variable resistor 48 in combination with a capacitor 46 determines the phase shift of the A.C. precharging voltage applied to the capacitor 20. Capacitor 46 provides some delay in the signal to provide better control of phase shift beyond 90° and the variable resistor 48 provides a means for varying the magnitude of the phase shift. The phase shifting variable resistor 48 and capacitor 46 are coupled between ground and the gate of a unijunction transistor 44. The base electrodes of the transistor 44 are respectively connected to the resistor 52 and the primary coil of an isolation transformer 42. When the voltage on the gate of transistor 44 reaches a critical value, determined in part by the setting the resistor 48, a pulse is fired from the transistor 44 to the primary of the transformer 42. This pulse is coupled through the secondary of the transformer 42 and a resistor 43 to the gate of the SCR 36.

Figure 3:
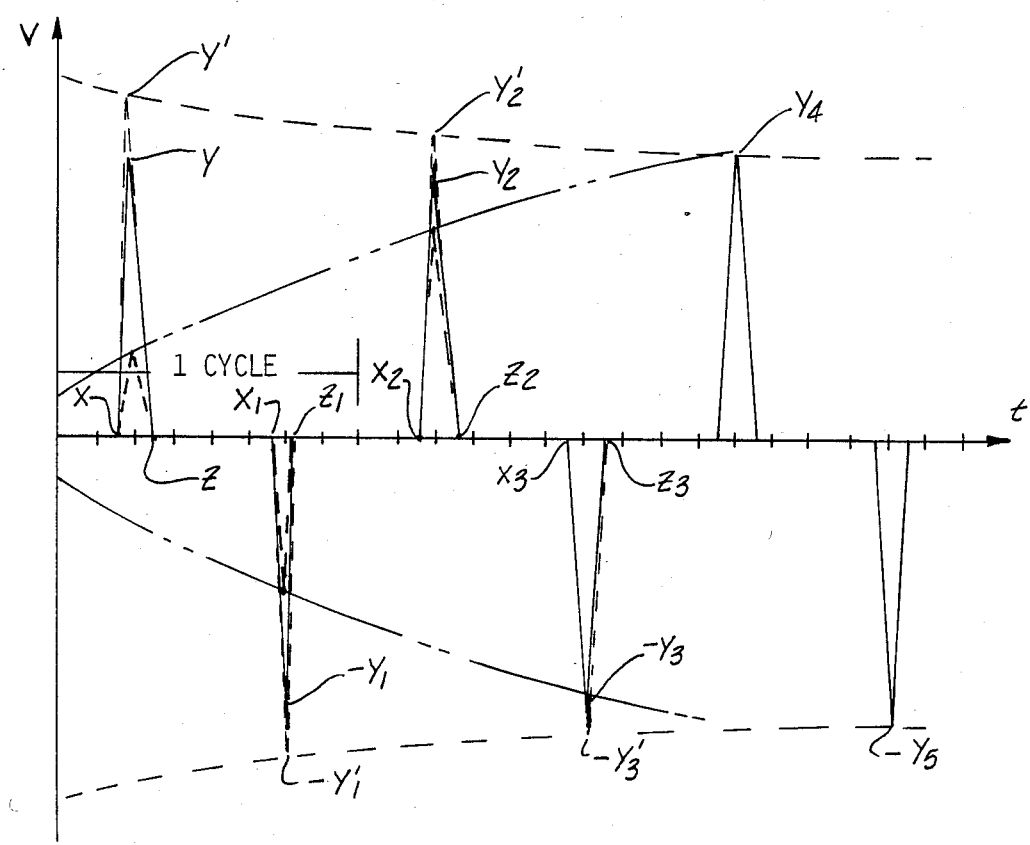
FIG. 3 is a graph of the voltage spikes produced by the power supply of the present invention, and showing the performance of a typical prior art power supply.
Figure 4:
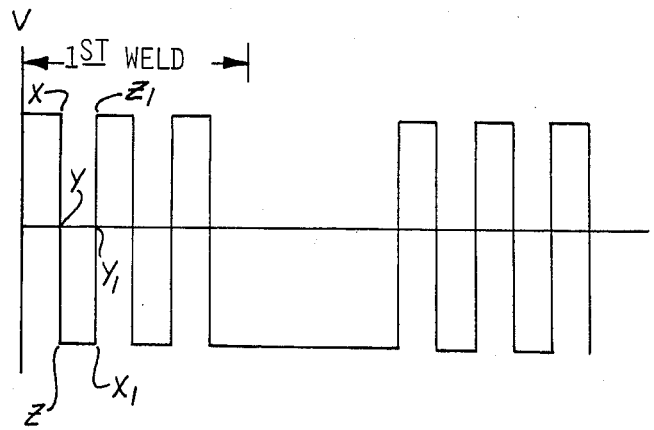
FIG. 4 is a graph of the voltage charge on the firing capacitor of the power supply shown in FIG. 1.

FIG. 4 depicts the charge applied to the capacitor 20 during each successive cycle of applied A.C. voltage. During the first cycle of the voltage, the capacitor is initially charged to its full value X and the commencement of the weld. The charge then drops to a value Y during discharge and thereafter the capacitor 20 is charged to a negative value Z. The charging and discharging of the capacitor 20 during the first half cycle of applied voltage results in a voltage spike as shown in FIG. 3 having a peak value Y. The first cycle is completed by another sequence of discharging the capacitor 20 from value $X_1$ to $Y_1$ followed by recharging to a voltage $Z_1$. This latter sequence of charging and discharging results in the negative voltage spike shown in FIG. 3 having a maximum negative value $Y_1$.

As shown in FIG. 3, the magnitude Y of the first voltage spike is at least equal to those of subsequent voltage spikes owing to the novel precharging circuit according to the present invention. It is therefore possible to produce satisfactory welds with only one, or a very few spikes in order to avoid overheating of the welded materials. Also plotted in FIG. 3 for comparative purposes is the envelope 120 of the spikes produced by a conventional spike welding system during the first few cycles of operation before the main firing capacitor becomes fully charged. It may be seen that the initial voltage of the spikes during the first few cycles is substantially less than that provided with the present invention.

In some cases it may be desirable to supply voltage spikes during the first few cycles of operation which are somewhat greater in magnitude than those of normal, steady state operation. This accomplished in the present invention by selecting a charging transformer 38 having characteristics such that the energy stored and transferred to the capacitor 20 is above the line voltage derived from the step-down transformer 16. Charging the capacitor 20 to a voltage above normal line voltage during the first few cycles of operation results in voltage spikes $Y', -Y'_1, Y'_2, -Y'_3$.

From the foregoing, it is apparent that the spike welding system having an improved power supply described above not only provides for the reliable accomplishment of the objects of the invention but does so in a particularly effective and efficient manner. It is recognized, of course, that those skilled in the art may make various modifications or additions to the preferred embodiment chosen to illustrate the invention without departing from the spirit and scope of the present contribution to the art. Accordingly, it is to understood that the protection sought and to be afforded hereby should be deemed to extend to the subject matter claimed and all equivalents thereof fairly within the scope of the invention.

I claim:

1. Power supply apparatus for use with an electrical pulse welder, comprising:
    a source of alternating current electrical power;
    a firing circuit coupled with said power source including
    (1) a transformer having a primary and having a secondary adapted to be coupled with welding electrodes for delivering a current pulse to said electrodes,
    (2) electrical power storage means for storing a quantity of electrical energy sufficient in magnitude to produce said current pulse,
    (3) first switching means for switching said power source, said storage means, and said primary of said transformer into series circuit with each other, whereby to transfer said quantity of electrical energy from said storage means to said primary; and
    means for precharging said storage means with said quantity of electrical energy prior to switching said power source into circuit with said storage means, said precharging means including
    (1) means for manually selecting the quantity of electrical energy with which said storage means is precharged,
    (2) means responsive to said selecting means for generating a count corresponding to the number of cycles of said alternating current from said power source required to precharge said storage means with the selected quantity of electrical energy,
    (3) means for storing the count generated by said count generating means,
    (4) a manually operable switch for controlling said firing circuit to generate an electrical welding pulse, and
    (5) second switching means responsive to the count stored in said storing means and to said manually operable switch for switching said power source into circuit with said storage means for a duration corresponding to the count stored in said storing means.

2. The power supply apparatus of claim 1, wherein said precharging means includes a transformer having a primary coil connected with said power source.

3. The power supply apparatus of claim 1, wherein said transformer includes a shorted secondary coil.

4. The power supply apparatus of claim 1, wherein said precharging means includes a selectively closeable, normally open circuit connecting said second switching means with said storage means whereby to prevent precharging of said storage means during transfer of said quantity of electrical energy to said primary from said storage means.

5. The power supply apparatus of claims 1, wherein said precharging means includes means for rectifying one half of the wave of the electrical power derived from said power source.

6. The power supply apparatus of claim 1, wherein said count generating means includes a latch having an input connected to said manually operable switch and an output, said count generating means further including a counter having an input for receiving a count from said latch.

7. The power supply apparatus of claim 1, including;
    means for rectifying one half of the electrical power supply derived from said power source;
    said rectifying means including a control input connected with said count generating means for controlling the timing of the rectification of said electrical power; and,
    means coupled between said count generating means and said control input for isolating said control input from electrical noise.

8. The power supply apparatus of claim 7, wherein said isolating means includes:
    an electro-optical switch having an input responsive to the said count generating means and an output for delivering a control signal, and
    a transistor having a gate responsive to said control signal.

9. The power supply apparatus of claim 1, including means for sensing termination of the power from said source thereof and means responsive to said sensing means for discharging the electrical energy stored in said storing means upon termination of said power.

10. Electrical pulse welding apparatus, comprising:
    a source of alternating current electrical power;
    electrodes adapted to contact a workpiece to be welded for delivering one or more pulses of electrical current through said workpiece;
    a transformer having a primary and secondary coupled with said electrodes for delivering voltage pulses to said electrodes;
    capacitive means for normally storing voltage of a preselected value during each half cycle of alternating current supplied by said power source,
    first means for switching said capacitive means and said transformer into circuit with said power source, said capacitive means, said primary, said power source and said switching means being connected with each other in a series circuit; and
    means for precharging said capacitive means to at least said preselected value of voltage prior to said first half cycle of said alternating current, whereby said first current pulse produced by said preselected value of voltage has a magnitude at least equal to the magnitude of subsequently produced current pulse employed to create the weld, said precharging means including
    (1) means for selecting the value of voltage to which said capacitive means is to be precharged,
    (2) means responsive to said selecting means for generating digital data corresponding to the selected voltage value,
    (3) means for storing said digital data, and
    (4) second means for switching said capacitive means into circuit with said power source for a duration determined by the digital data stored in said storing means.

11. The welding apparatus of claim 10, wherein said second switching means includes an electrically responsive coil and at least one normally open contact connected between said power source and said capacitive means and controlled by said coil.

12. The welding apparatus of claim 10, wherein said switching means includes:

a source of recurrent clock pulses, a switch for initiating an electrical welding pulse, means controlled by said pulse initiating switch for generating a gate signal, means responsive to said gate signal for gating said clock pulses for a duration determined by said stored digital data.

13. The welding apparatus of claim 12, wherein:

said storing means includes a counter, and said gate generating means includes a circuit having two conditions of permanent stability including means for changing from one of the conditions to the other condition in response to a signal from said pulse initiating switch and to said digital data.

14. The welding apparatus of claim 10 wherein said switching means includes means for selectively shifting the phase of the alternating current electrical power applied to said capacitive means during precharging of said capacitive means.

* * * * *